June 18, 1968   G. P. BAYNES ET AL   3,388,775

DISC BRAKE WITH POCKETED QUICK CHANGE SHOE ASSEMBLY

Filed Oct. 21, 1966

INVENTORS
Gene P. Baynes, &
Gerald B. Jacoby

ATTORNEY

United States Patent Office 3,388,775
Patented June 18, 1968

3,388,775
DISC BRAKE WITH POCKETED QUICK
CHANGE SHOE ASSEMBLY
Gene P. Baynes, Kettering, and Gerald B. Jacoby, Dayton, Ohio, assignors to General Motors Corporation, Detroit, Mich., a corporation of Delaware
Filed Oct. 21, 1966, Ser. No. 588,390
1 Claim. (Cl. 188—73)

ABSTRACT OF THE DISCLOSURE

The invention relates to disc brake mechanisms and more particularly to a disc brake cylinder assembly in which the brake shoe or shoes can be quickly removed and replaced. Arcuate abutments are formed on both the shoes and caliper with an aperture in said caliper of length less than the length of said shoes but greater than the shoes' width to receive said shoes therein. Pin means extend through aligned apertures in said shoes and caliper to prevent withdrawal of the shoes from the caliper and for pivoting movement of the shoes to ensure area contact of adjacent abutment faces on the shoes and caliper.

---

Disc brake calipers have been previously constructed with removable brake shoe assemblies. It has been common practice to provide calipers with a radially outward opening through which the brake shoe assembly or assemblies may be inserted and removed, and to provide suitable removable means for retaining the assemblies in place. Such caliper assemblies provide access openings which are sufficiently large to merely slide the shoe in place by direct radial movement. Thus the caliper abutments for the shoe assemblies played no part in retention of the shoes from radially outward movement. Some caliper assemblies have utilized the abutments to provide radially outward retention of the shoe assemblies but did not permit quick change installation.

Brake caliper assemblies embodying the invention permit the quick removal of the brake shoe assemblies and the insertion in place of other shoe assemblies, while utilizing the shoe abutments of the caliper assemblies to aid in preventing radially outward movement of the shoes after installation of the shoe assembly. At the same time, the conformation and relationship of the caliper housing assembly abutments and the shoe assembly abutments are such that substantially full torque receiving area contact is maintained between each shoe assembly and an associated caliper assembly abutment when the brakes are applied. This is accomplished by providing caliper brake shoe assembly receiving abutments which are defined as arcuate sections of the inner wall of a cylinder, and the abutment-engaging ends of the brake shoe assemblies as arcuate sections of the outer wall of a similar cylinder. The radially outer opening through which the shoe assemblies are removed and replaced is wider than the thickness of the shoe assembly but is shorter than the length of the shoe assembly. By utilizing arcuate cylinder wall sections for abutments, a shoe assembly may be inserted by first placing one end of the shoe assembly through the opening and into engagement with an abutment area radially inwardly relative to the disc and then rotating the shoe assembly until it is properly positioned. The caliper is provided with axially aligned apertured mounting lugs and the brake shoe assembly is provided with a similar apertured lug so that a shoe retaining and pivot pin may be inserted therethrough. This pin will not only assist in retaining the shoes within the caliper housing but also provides a pivot so that when the shoes are forced into braking engagement with the disc they pivot slightly about the pin to take up any tolerance between a shoe end and the associated abutment and establish surface area torque receiving contact with the caliper housing.

Figure 1:
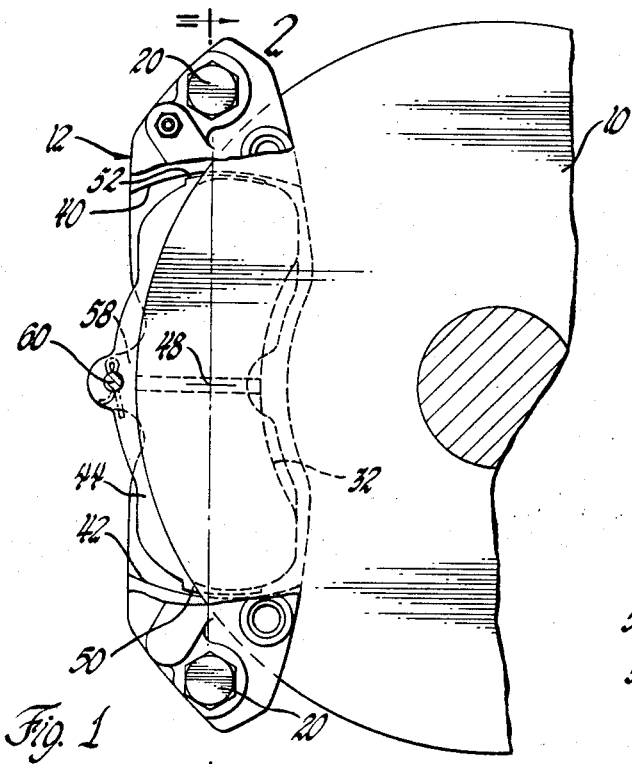
FIGURE 1 is an elevation view of a disc brake assembly embodying the invention, with parts broken away and in section.

The brake assembly includes a disc 10 mounted for rotation with a member to be braked, such as a vehicle wheel. The brake caliper assembly 12 is suitably mounted to a non-rotatable element which may, for example, be attached to the steering knuckle of a vehicle front wheel or the axle housing of a vehicle rear wheel. The caliper assembly includes a housing 14 having an inner housing section 16 and an outer housing section 18. The housing sections are joined together by bolts 20 and are so arranged as to have an opening 22 in which a segment of the disc 10 is received so that the housing sections extend chordally across a portion of the disc. The particular caliper assembly illustrated in the drawing has opposed pistons 24 in opposed cylinders 26 and is provided with suitable fluid passages 28 connected to pressure chambers 30 formed by the cylinders 26 and pistons 24, for brake energization. The pistons operatively engage the brake shoe assemblies 32 and 34, which are positioned on opposite sides of the disc 10, and urge the brake shoe assemblies into braking engagement with the friction surfaces of the disc. It is to be understood that the invention may also be utilized in calipers having different mounting and piston arrangements, and that the caliper assembly may be slidably or pivotally mounted when one or more pistons are provided only on one side of the disc.

The housing section 16 is provided with brake shoe assembly abutments 36 and 38, and housing section 18 is provided with similar abutments 40 and 42. Each brake shoe assembly includes a backing plate 44 and suitable friction material 46. As is more particularly shown in FIGURES 1 and 3, the abutments may be defined as arcuate sections of the inner walls of a cylinder, the axis 48 of which extends parallel to the axis of rotation of the disc 10. The abutments of housing sections 16 and 18 are similar, and only those of section 18 will be described in detail. The arcuate abutments 40 and 42 are preferably disposed diametrically opposite each other in relation to the axis 48, at least to the extent that a diameter of the cylinder defining the arcuate sections will extend to both abutments. Thus the radially outer end of the part of opening 22 formed by the abutments is shorter than the length of the brake shoe assemblies installed therein. It is also preferable that the cylinder axis 48 be below the effective brake radius of the disc 10. This is shown in FIGURE 1, as can be readily seen by observing the swept area of the disc 10 in relation to the friction material, with the brake shoe assemblies in position.

Figure 3:
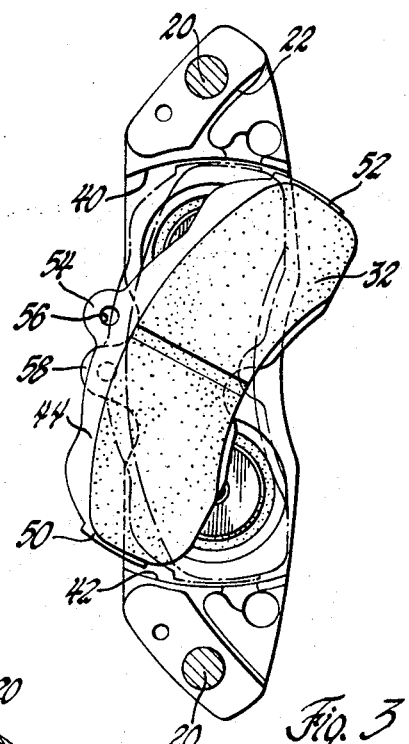
FIGURE 3 is a cross section view of the brake caliper assembly of FIGURE 2 taken in the direction of arrows 3—3 of that figure, and showing a brake shoe assembly in a series of positions assumed during insertion or removal.
Figure 2:
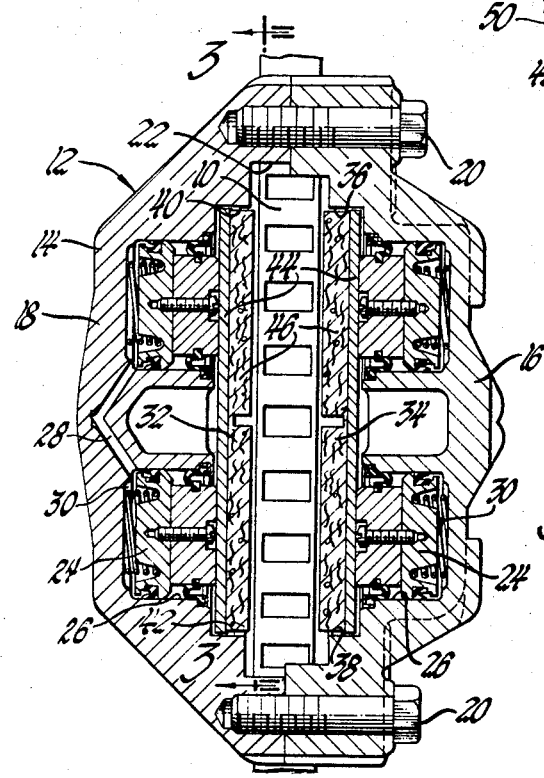
FIGURE 2 is a cross section view of the disc brake assembly of FIGURE 1, taken in the direction of arrows 2—2 of that figure.

Since each brake shoe assembly is similarly constructed, only the assembly 32, more particularly shown in FIGURES 1 and 3, will be further described. The brake shoe assembly 32 has an elongated configuration, preferably of a kidney shape, with a thickness from the back of the backing plate to the friction surface of the friction material being less than the width of the opening 22, and preferably less than the width of the opening 22 between the disc friction surface and the side wall of the opening through which the cylinders 26 are formed. This permits the brake shoe assembly to be moved into position by first pushing the pistons into their cylinders until sufficient clearance is provided between the piston shoe engaging ends and the disc friction surface to permit insertion of the shoe assembly. The ends 50 and 52 of shoe assembly 32, and more particularly of the backing plate 44 thereof, are formed as opposed arcuate outer wall sections of another cylinder having substantially the same radius as the cylinder defining the abutment inner walls, but no greater radius than the radius of that cylinder. In practice, it has been found desirable to provide a tolerance so that the clearance of the ends of the brake shoe assembly and the caliper housing abutments is on the order of .020 to .050 inch, thereby allowing for manufacturing tolerances and differences in heat expansion without binding. The arcuate ends 50 and 52 may be identically formed, and preferably extend arcuately for a distance less than the width of the shoe assembly in order to facilitate the insertion and removal of the shoe assembly. This also aids in providing a more exact location of the point of torque reaction. The shoe assembly is provided with an ear 54 having an aperture 56 formed therethrough, the aperture being located radially outwardly of the axis 48 relative to the disc 10, with the shoe assembly installed in the housing. Each housing section is provided with a mounting lug, with lug 58 of housing section 18 being shown in FIGURE 3. The lugs are positioned radially outwardly of the axis 48 relative to the disc 10 and have apertures formed therein which are axially aligned with each aperture 56 when the brake shoe assemblies 32 and 34 are in position. When the apertures are so aligned, a removable retaining pivot pin 60 is installed through both housing assembly lugs and through the ear 54 of each brake shoe assembly and suitably secured in place. It can be seen that when it is desired to remove one or both of the brake shoe assemblies, the pin 60 is removed and one of the shoe assembly ends, such as end 50, is moved rotatably outward, with the brake shoe assembly rotating substantially about axis 48 or pivoting about its other end which remains in the opening 22 and in engagement with its associated abutment. After one end of the shoe assembly is clear, the assembly may then be linearly removed. A new shoe assembly may be installed by reversing the procedure. As shown in FIGURE 3, the end 52 may be inserted to a position adjacent the radially inner end of abutment 40 relative to disc 10, the shoe assembly pivoted into place, and the pin 60 installed through the lug and ear apertures.

When the vehicle brakes are applied, the brake shoe assembly ends tend to pivot about pin 60. Since this pin is located in spaced relation to axis 48, the end of the shoe assembly tending to move radially outwardly of the disc 10 will engage its associated arcuate abutment and establish a substantially full area torque receiving contact of the shoe assembly arcuate ends with the associated abutment. Since, as noted above, there is very small clearance between the shoe ends 50 and 52 and the abutments 40 and 42, a very small amount of shoe assembly pivoting movement about pin 60 is required to accomplish this result. Due to this construction the shoe assembly can be removed radially inwardly or outwardly of the housing assembly only with the requisite pivotal movement illustrated in FIGURE 3. This is established by the fact that the length of the disc shoe assembly is greater than the length of the opening 22 at the outer ends of the housing assembly abutments but is less than the diagonal length of the portion of the opening 22 measured from the radially outer end of one abutment to a point adjacent a radially inner end of the other abutment of the same housing section.

A disc brake caliper assembly has been disclosed in which housing brake shoe abutments are formed as opposed arcuate inner wall sections of a cylinder. Brake shoe assembly ends, which may engage the abutments, are similarly formed as opposed arcuate outer wall sections of a cylinder of similar but not greater size, the abutments being so arranged that the shoe must be installed by inserting one end into the shoe receiving caliper opening and pivoting the other end into position. The provision of abutments and brake shoe assembly ends which are arcuate sections of right circular cylinders having a common axis when the members are in the installed position permits the establishment of substantially full area torque receiving contact of a shoe end with its associated abutment. Thus not only are the shoes more positively retained in place while providing for quick removal and replacement, but they also insure proper torque receiving engagement of the shoe assembly in the housing. The invention may be utilized in caliper housings having one or more slidably movable brake shoe assemblies having one or more shoe assembly actuating mechanisms such as pistons 24.

We claim:
1. A disc brake caliper assembly for braking a brake disc and comprising:
   a housing having brake shoe abutments formed as opposed arcuate inner wall sections of a first cylinder, brake shoe mounting lugs with axially aligned apertures spaced radially outwardly of the axis of said first cylinder relative to the disc to be braked, said first cylinder axis being below the effective brake radius of the disc to be braked;
   an elongated brake shoe assembly having the ends thereof formed as opposite arcuate outer wall sections of a second cylinder having substantially the same but no greater radius than the radius of said first cylinder, said shoe assembly further having an ear with an aperture therethrough aligned during assembly with said mounting lug axially aligned apertures;
   said housing having a circumferentially arcuate opening extending between the radially outer ends of said abutments and between said mounting lugs and having a width greater than the width of said brake shoe assembly and a length less than the length of said brake shoe assembly;
   the length of said brake shoe assembly being no greater than the distance between the radially inner end of one of said abutments and the radially outer end of the other of said abutments to permit quick shoe assembly by insertion of one shoe end through said opening into contact with the radially inner part of one of said abutments and pivoting the shoe assembly into a position wherein said apertures are aligned;
   and a removable retaining pivot pin received through said apertures, said shoe assembly pivoting about said pin during brake actuation to tend to move one end of the shoe assembly radially outwardly of the disc and to take up any tolerance between the outwardly moving end of the shoe assembly and the abutment associated therewith and to establish a substantially full area torque receiving contact of at least one of said brake shoe assembly arcuate ends and at least one of said abutments.

References Cited
UNITED STATES PATENTS
| | | | |
|---|---|---|---|
| 2,951,561 | 9/1960 | Davis | 188—73 |
| 3,285,371 | 11/1966 | Cadiou | 188—73 |
| 3,331,471 | 7/1967 | Redmayne | 188—73 |

FOREIGN PATENTS
| | | |
|---|---|---|
| 828,961 | 2/1960 | Great Britain. |

FERGUS S. MIDDLETON, *Primary Examiner.*

G. E. A. HALVOSA, *Examiner.*